US009634777B2

(12) United States Patent
Lambert et al.

(10) Patent No.: US 9,634,777 B2
(45) Date of Patent: *Apr. 25, 2017

(54) SYSTEMS AND METHODS FOR MEASUREMENT OF ELECTRICAL CHANNEL LOSS

(71) Applicant: Dell Products L.P., Round Rock, TX (US)

(72) Inventors: Timothy M. Lambert, Austin, TX (US); Bhavesh Govindbhai Patel, Austin, TX (US); Bhyrav M. Mutnury, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/150,594

(22) Filed: May 10, 2016

(65) Prior Publication Data

US 2016/0254872 A1  Sep. 1, 2016

Related U.S. Application Data

(63) Continuation of application No. 14/052,050, filed on Oct. 11, 2013, now Pat. No. 9,363,026.

(51) Int. Cl.
*H04B 17/00* (2015.01)
*H04B 17/309* (2015.01)
*H04B 17/10* (2015.01)

(52) U.S. Cl.
CPC ......... *H04B 17/309* (2015.01); *H04B 17/104* (2015.01)

(58) Field of Classification Search
CPC ............................ H04B 17/309; H04B 17/104
USPC ......................................................... 375/224
See application file for complete search history.

(56) References Cited

U.S. PATENT DOCUMENTS

| 4,807,147 | A | * | 2/1989 | Halbert | H03M 1/1255 |
|---|---|---|---|---|---|
| | | | | | 324/76.15 |
| 7,590,491 | B2 | * | 9/2009 | Saenger | G01V 1/28 |
| | | | | | 702/14 |
| 7,656,985 | B1 | * | 2/2010 | Aweya | H03L 7/093 |
| | | | | | 331/16 |
| 7,860,205 | B1 | * | 12/2010 | Aweya | H03L 7/093 |
| | | | | | 370/497 |
| 8,396,105 | B2 | * | 3/2013 | Gerfers | H04L 25/0305 |
| | | | | | 375/232 |
| 9,363,026 | B2 | * | 6/2016 | Lambert | H04B 17/104 |

(Continued)

*Primary Examiner* — Daniel Washburn
*Assistant Examiner* — Berhanu Tadese
(74) *Attorney, Agent, or Firm* — Jackson Walker L.L.P.

(57) ABSTRACT

In accordance with embodiments of the present disclosure, a method for characterizing electrical characteristics of a communication channel between a transmitter of a first information handling resource and a receiver of a second information handling resource may include receiving a test signal at the receiver from the transmitter during an in-situ characterization mode of the second information handling resource, converting the test signal into a discrete-time digital signal representing the test signal, generating a discrete-time finite difference function comprising a first derivative of the discrete-time digital signal, transforming the discrete-time finite difference function into a frequency-domain transform of the discrete-time finite difference function.

12 Claims, 2 Drawing Sheets

(56) References Cited

U.S. PATENT DOCUMENTS

| | | | | |
|---|---|---|---|---|
| 2005/0003846 A1* | 1/2005 | Anderson | ........... | H04W 52/225 455/522 |
| 2005/0271130 A1* | 12/2005 | Howard | ............... | H04B 17/309 375/224 |
| 2006/0227912 A1* | 10/2006 | Leibowitz | ........ | G01R 31/31709 375/350 |
| 2007/0002964 A1* | 1/2007 | Xu | .......................... | H04L 43/50 375/271 |
| 2007/0257681 A1* | 11/2007 | Christophersen | .. | G01R 31/3651 324/426 |
| 2010/0218145 A1* | 8/2010 | Engin | ................. | G06F 17/5018 716/130 |
| 2010/0293367 A1* | 11/2010 | Berke | ................. | G06F 11/3476 713/100 |
| 2011/0296358 A1* | 12/2011 | Dewey, III | .......... | G06F 17/5018 716/106 |
| 2013/0243061 A1* | 9/2013 | Dark | ....................... | H04L 1/248 375/224 |
| 2014/0101475 A1* | 4/2014 | Berke | .................... | G06F 1/3206 713/340 |

\* cited by examiner

SYSTEMS AND METHODS FOR MEASUREMENT OF ELECTRICAL CHANNEL LOSS

The present patent application is a continuation of a previously filed patent application, U.S. patent application Ser. No. 14/052,050, filed Oct. 11, 2013, the entirety of which is hereby incorporated by reference.

TECHNICAL FIELD

The present disclosure relates in general to information handling systems, and more particularly to measurement of electrical channel loss in communications paths in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various components of information handling systems often employ high-speed communication. As communication speeds increase, electrical loss in a communications channel between a transmitting component and a receiving component of the information handling system may become increasingly problematic, and accordingly, it is desirable for manufacturers of information handling systems and their various information handling resources to measure and characterize such electrical loss, which may vary according to process differences, manufacturer differences, and other differences. However, many existing approaches applied to measure electrical loss of a communications channel do not effectively isolate the loss and other electrical characteristics of the channel from loss caused by the transmitting component and the receiving component (e.g., equalization filtering mechanisms of a receiving block).

SUMMARY

In accordance with the teachings of the present disclosure, the disadvantages and problems associated with electrical channel loss measurement have been reduced or eliminated.

In accordance with embodiments of the present disclosure, an information handling system may include a processor, a first information handling resource communicatively coupled to the processor, and a second information handling resource communicatively coupled to the processor and the first information handling resource, and a baseboard management controller communicatively coupled to the second information handling resource. The second information handling resource having a receiver configured to receive a test signal from a transmitter of the first information handling system resource during an in-situ characterization mode of the second information handling resource, convert the test signal into a discrete-time digital signal representing the test signal, and generate a discrete-time finite difference function comprising a first derivative of the discrete-time digital signal. The baseboard management controller may be communicatively coupled to the second information handling resource and configured to transform the discrete-time finite difference function into a frequency-domain transform of the discrete-time finite difference function.

In accordance with these and other embodiments of the present disclosure, a method for characterizing electrical characteristics of a communication channel between a transmitter of a first information handling resource and a receiver of a second information handling resource may include receiving a test signal at the receiver from the transmitter during an in-situ characterization mode of the second information handling resource, converting the test signal into a discrete-time digital signal representing the test signal, generating a discrete-time finite difference function comprising a first derivative of the discrete-time digital signal, transforming the discrete-time finite difference function into a frequency-domain transform of the discrete-time finite difference function.

In accordance with these and other embodiments of the present disclosure, an article of manufacture may include non-transitory computer-readable media and computer-executable instructions carried on the non-transitory computer-readable media, the instructions readable by one or more processors. The instructions, when read and executed, may cause the one or more processors to characterize electrical characteristics of a communication channel between a transmitter of a first information handling resource and a receiver of a second information handling resource, wherein the instructions for causing the one or more processors to characterize the electrical characteristics comprise instructions for causing the processor to receive a test signal at the receiver from the transmitter during an in-situ characterization mode of the second information handling resource, convert the test signal into a discrete-time digital signal representing the test signal, generate a discrete-time finite difference function comprising a first derivative of the discrete-time digital signal, and transform the discrete-time finite difference function into a frequency-domain transform of the discrete-time finite difference function.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
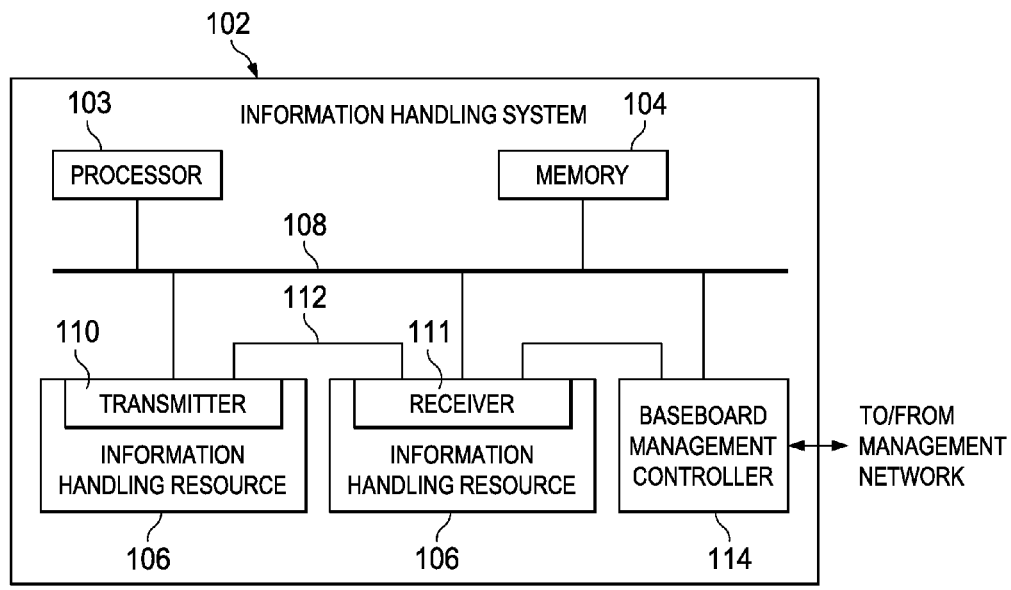
FIG. 1 illustrates a block diagram of an example information handling system, in accordance with embodiments of the present disclosure.
Figure 2:
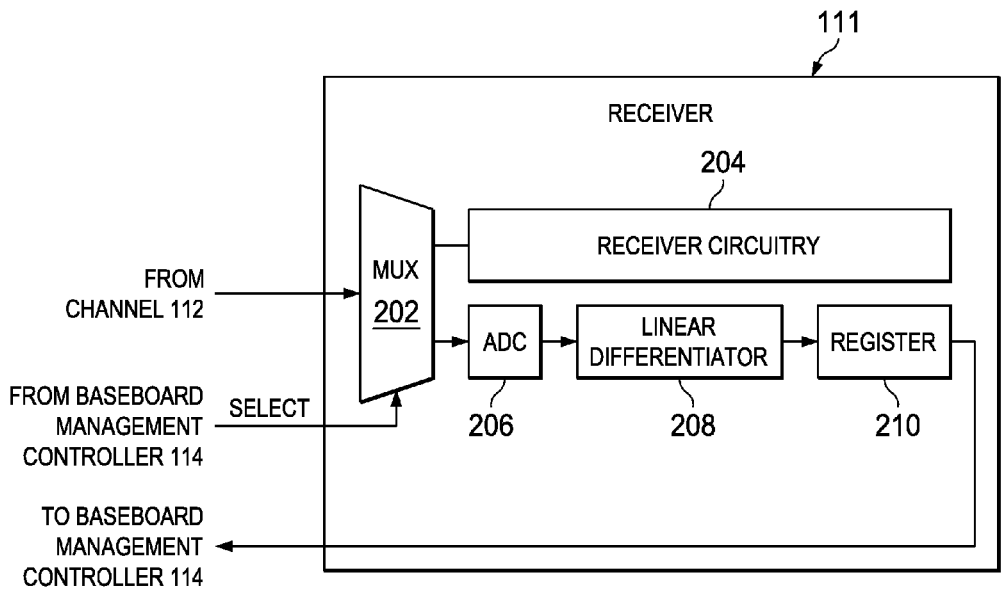
FIG. 2 illustrates a block diagram of an example receiver, in accordance with embodiments of the present disclosure.
Figure 3:
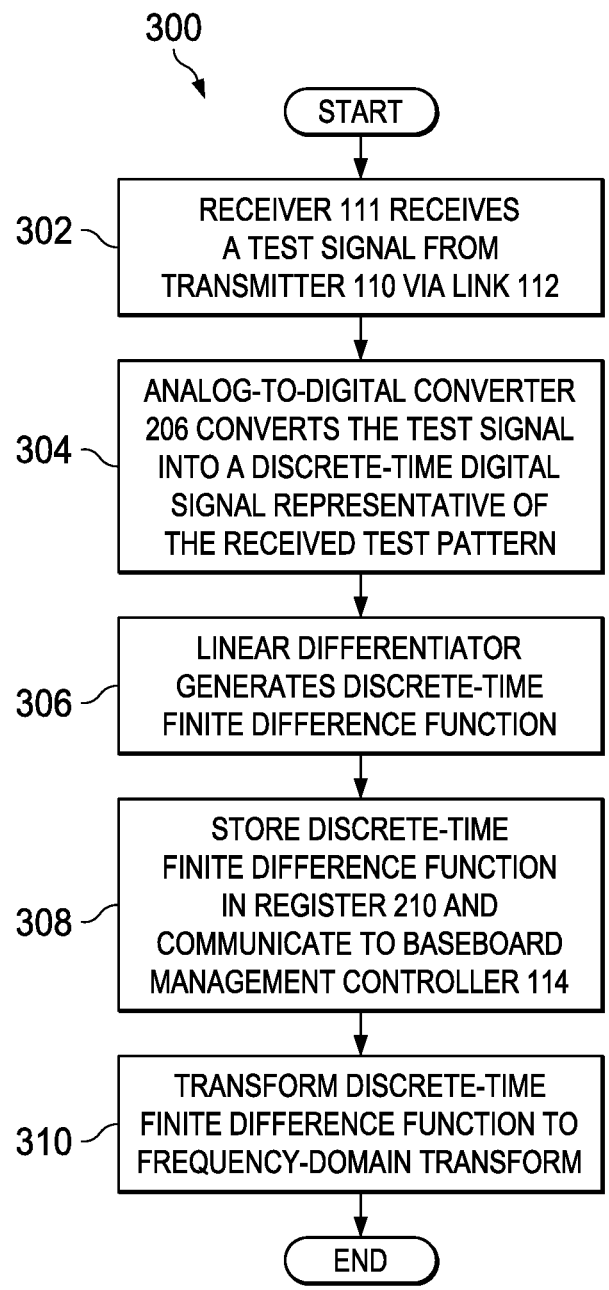
FIG. 3 illustrates a flow chart of an example method for measuring electrical channel loss, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, one or more information handling resources 106 communicatively coupled to processor 103 via a bus 108, and a baseboard management controller 114.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

An information handling resource 106 may include any component system, device or apparatus of information handling system 102 that may communicate with processor 103, memory 104, and/or one or more other information handling resources via one or more busses 108. For example, an information handling resource may include service processors, BIOSs, an I/O device, a storage resource, a network interface, or any other suitable component.

As shown in FIG. 1, one or more information handling resources 106 may include a transmitter 110. A transmitter 110 may comprise any system, device, or apparatus configured to transmit signals to one or more corresponding receivers 111 of other information handling resources 106 via link 112.

Also as shown in FIG. 1, one or more information handling resources 106 may include a receiver 111. A receiver 111 may comprise any system, device, or apparatus configured to receive signals from one or more corresponding transmitters 110 of other information handling resources 106 via link 112. In some embodiments, as further described in reference to FIGS. 2 and 3 below, a receiver 111 may include structure and functionality for measurement of electrical channel loss between transmitter 110 and receiver 111.

As shown in FIG. 1, information handling resources 106 may be communicatively coupled via a link 112. Link 112 may comprise any system, device, or apparatus configured to transfer data between information handling resources 106, and may include a point-to-point connection.

Baseboard management controller 114 may be coupled to bus 108 and/or receiver 111 and may comprise a specialized microcontroller which may be embedded on a motherboard of information handling system 114 and coupled to and embedded on the motherboard of information handling system 102. Baseboard management controller 114 may manage an interface between system management software (e.g., which may interface with baseboard management controller 114 via a management network external to information handling system 102) and information handling resources of information handling system 102. For example, different types of sensors built into information handling system 102 may report to baseboard management controller 114 on parameters such as temperature, cooling fan speeds, power status, operating system status, etc. Baseboard management controller 114 may monitor the sensors and may send alerts to a system administrator via the management network if any of the parameters do not stay within preset limits, indicating a potential failure of information handling system 102. The administrator can also remotely communicate with baseboard management controller 114 to take some corrective action such as resetting or power cycling information handling system 102 in order to cause a stalled operating system to execute again. In addition, as described in greater detail below with respect to FIGS. 2 and 3, baseboard management controller 114 may act in concert with receiver 111 to measure electrical channel loss between transmitter 110 and receiver 111.

FIG. 2 illustrates a block diagram of an example receiver 111, in accordance with embodiments of the present disclosure. As shown in FIG. 2, receiver 111 may comprise a multiplexer 202, traditional receiver circuitry 204, analog-to-digital converter 206, linear differentiator 208, and register 210. Multiplexer 202 may comprise any system, device or apparatus configured to receive a signal from transmitter 110 via link 112 and based on a select signal received from baseboard management controller 114, operate in one of a default mode and a BMC-only mode. In the default mode, receiver operates in a normal training mode, and parameters calculated in an in-situ characterization mode (as described in greater detail below) may be used to assist in such training. In the BMC-only mode, which may take place for example if receiver 111 is not able successfully complete a training mode and/or during a manufacturing test, the signal from channel 112 may be received by analog-to-digital converter 206, processed by linear differentiator 208, and stored in register 210 as a result of in-situ characterization measurement of channel 112, wherein such measurement may be read by baseboard management controller 114 and further processed by baseboard management controller 114 and/or utilized by a user for design and/or debugging purposes.

Receiver circuitry 204 may comprise standard receiver circuitry configured to process an incoming signal for further processing by the receiving information handling resource 106, as is known in the art.

Analog-to-digital converter 206 may comprise any system, device, or apparatus configured to convert a continuous physical quantity (i.e. a voltage representing the signal received by receiver 111) to a digital number that represents the quantity's amplitude.

Linear differentiator 208 may comprise any system, device, or apparatus configured such that the output of linear differentiator 208 is approximately directly proportional to the rate of change (the time derivative) of its input.

Register 210 may comprise any system, device, or apparatus configured to store output signals generated by linear differentiator 208 (e.g., a computer-readable medium).

As described in greater detail below with respect to FIG. 3, in operation, receiver 111 and baseboard management controller 114 may work in concert during an in-situ characterization mode to characterize electrical channel loss of the channel between transmitter 110 and receiver 111.

FIG. 3 illustrates a flow chart of an example method 300 for measuring electrical channel loss, in accordance with embodiments of the present disclosure. Method 300 may operate when receiver 111 is placed in an in-situ characterization mode (e.g., when baseboard management controller 114 communicates a select signal to multiplexer 202 such that an input signal of receiver 111 is communicated to analog-to-digital converter 206). According to one embodiment, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, receiver 111 may receive a test signal from transmitter 110 via link 112. In some embodiments, the test signal may comprise a series (e.g., 200 or more) of logic zeroes followed by a series (e.g., 1000 or more) of logic ones, such that the test signal approximates, in the analog domain, a unit impulse function. In such embodiments, the ratio of logic ones to logic zeroes may be greater than a predetermined ratio (e.g., five). In addition, in such embodiments, the test signal may be periodically repeated during in-situ characterization.

At step 304, analog-to-digital converter 206 may convert the test signal into a discrete-time digital signal representing the test signal. Thus, where the test signal received is given by the function x(t) in the continuous time domain, the output of analog-to-digital converter 206 may be given by the function x(n) (for N=0, 1, 2, . . . , N−1, N) in the discrete time domain.

At step 306, linear differentiator 208 may generate a discrete-time finite difference function comprising a first derivative of the discrete-time derivative signal. Stated another way, linear differentiator 208 may generate for each discrete value of x(n) a finite difference x'(n) (e.g., generate the derivative of) between the discrete value of the previous (e.g., n−1) discrete value of x(n) such that x'(n)=x(n+1)−x(n).

At step 308, the finite difference function x'(n) may be stored in register 210 and communicated to baseboard management controller 114.

At step 310, baseboard management controller 114 may transform finite difference function x'(n) to the frequency domain such that a discrete-time frequency-domain transform X(k) may be given by the equation:

$$X(k) = \sum_{n=0}^{N-1} x(n), e^{-i\left(\frac{2\pi}{N}\right)kn} \text{where } k = 0, 1, 2, \ldots N-1, N$$

wherein such equation may be used to determine loss at each relevant value of frequency. After completion of step 310, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Methods and systems described herein may provide numerous advantages. For example, the methods and systems may permit a design engineer to characterize the impact of material variation between one information handling resource vendor to another. As another example, the methods and systems may permit a design engineer to determine full channel loss (e.g., including integrated circuit, package, and printed circuit board) of an electrical path, rather than merely a link (e.g., link 112) between information handling resources. As an additional example, the methods and systems may permit a design engineer to aggressively design information handling systems with high-quality, fast links between information handling resources and the ability to debug both silicon and overall system-related issues. As a further example, the methods and systems may permit a design engineer to determine channel-to-channel and slot-to-slot variation across single and multiple information handling systems in a high-volume production environment. As yet another example, the methods and systems may permit a design engineer to understand information handling system behavior and interconnect behavior in a complex interconnect configuration.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a processor;
a first information handling resource communicatively coupled to the processor;
a second information handling resource communicatively coupled to the processor and the first information handling resource, the second information handling resource having a receiver configured to:
  receive a test signal from a transmitter of the first information handling system resource;
  convert the test signal into a discrete-time digital signal representing the test signal; and
  generate a discrete-time finite difference function comprising a first derivative with respect to time of the discrete-time digital signal; and
a baseboard management controller communicatively coupled to the second information handling resource and configured to transform the discrete-time finite difference function into a frequency-domain transform of the discrete-time finite difference function.

2. The information handling system of claim 1, wherein the test signal approximates a unit impulse function.

3. The information handling system of claim 1, wherein the test signal comprises a digital string of logic zeroes followed by a digital string of logic ones.

4. The information handling system of claim 3, wherein a ratio of the number of logic ones to the number of logic zeroes is greater than or equal to five.

5. A method for characterizing electrical characteristics of a communication channel between a transmitter of a first information handling resource and a receiver of a second information handling resource comprising:
receiving a test signal at the receiver from the transmitter;
converting the test signal into a discrete-time digital signal representing the test signal;
generating a discrete-time finite difference function comprising a first derivative with respect to time of the discrete-time digital signal; and
transforming the discrete-time finite difference function into a frequency-domain transform of the discrete-time finite difference function.

6. The method of claim 5, wherein the test signal approximates a unit impulse function.

7. The method of claim 5, wherein the test signal comprises a digital string of logic zeroes followed by a digital string of logic ones.

8. The method of claim 7, wherein a ratio of the number of logic ones to the number of logic zeroes is greater than or equal to five.

9. An article of manufacture comprising:
non-transitory computer-readable media; and
computer-executable instructions carried on the non-transitory computer-readable media, the instructions readable by one or more processors, the instructions, when read and executed, for causing the one or more processors to characterize electrical characteristics of a communication channel between a transmitter of a first information handling resource and a receiver of a second information handling resource, wherein the instructions for causing the one or more processors to characterize the electrical characteristics comprise instructions for causing the processor to:
receive a test signal at the receiver from the transmitter;
convert the test signal into a discrete-time digital signal representing the test signal;
generate a discrete-time finite difference function comprising a first derivative with respect to time of the discrete-time digital signal; and
transform the discrete-time finite difference function into a frequency-domain transform of the discrete-time finite difference function.

10. The article of claim 9, wherein the test signal approximates a unit impulse function.

11. The article of claim 9, wherein the test signal comprises a digital string of logic zeroes followed by a digital string of logic ones.

12. The article of claim 11, wherein a ratio of the number of logic ones to the number of logic zeroes is greater than or equal to five.

* * * * *